United States Patent
Isaac et al.

(10) Patent No.: US 6,976,147 B1
(45) Date of Patent: Dec. 13, 2005

(54) STRIDE-BASED PREFETCH MECHANISM USING A PREDICTION CONFIDENCE VALUE

(75) Inventors: Roger D. Isaac, Austin, TX (US); Mitchell Alsup, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 299 days.

(21) Appl. No.: 10/347,828

(22) Filed: Jan. 21, 2003

(51) Int. Cl.[7] ............................................. G06F 12/00
(52) U.S. Cl. ..................... 711/205; 711/239; 711/137
(58) Field of Search ........................ 711/137, 205, 239; 712/205, 239

(56) References Cited

U.S. PATENT DOCUMENTS

| | | |
|---|---|---|
| 5,537,573 A | 7/1996 | Ware et al. |
| 5,740,399 A | 4/1998 | Mayfield et al. |
| 5,774,685 A | 6/1998 | Dubey |
| 5,809,529 A | 9/1998 | Mayfield |
| 5,941,981 A | 8/1999 | Tran |
| 6,119,203 A | 9/2000 | Snyder et al. |
| 6,138,213 A | 10/2000 | McMinn |
| 6,219,760 B1 | 4/2001 | McMinn |
| 6,571,318 B1 * | 5/2003 | Sander et al. ............... 711/137 |
| 2002/0023204 A1 * | 2/2002 | Barowski et al. ........... 712/239 |

OTHER PUBLICATIONS

Ki, et al., "Adaptive Data Prefetching Using Cache Information," Dept. of Computer Sciences, ICS 1997, Vienna Austria, pp. 204-212.

* cited by examiner

*Primary Examiner*—Mano Padmanabhan
*Assistant Examiner*—Duc T Doan
(74) *Attorney, Agent, or Firm*—Meyertons Hood Kivlin Kowert & Goetzel, P.C.; Stephen J. Curran

(57) ABSTRACT

A prefetch mechanism includes a prefetch predictor table coupled to a prefetch control. The prefetch predictor table may include a plurality of locations configured to store a plurality of entries each indicative of a stride between a respective pair of memory requests. Each of the plurality of entries may be stored in a respective one of the plurality of locations dependent upon a value of an earlier stride. The prefetch control may be configured to prefetch an address based upon a given one of the plurality of entries in the prefetch predictor table.

20 Claims, 7 Drawing Sheets

STRIDE-BASED PREFETCH MECHANISM USING A PREDICTION CONFIDENCE VALUE

BACKGROUND OF THE INVENTION

1. Field of the Invention

This invention relates to memory controllers and, more particularly, to prefetch mechanisms for prefetching data from memory.

2. Description of the Related Art

Memory latency is frequently a factor in determining the performance (e.g. instructions executed per second) of a processor (and for that matter any device requiring access to system memory) in a given computer system. Over time, the operating frequencies of processors have increased dramatically, while the latency for access to dynamic random access memory (DRAM) in the typical computer system has not decreased as dramatically. Additionally, transmitting memory requests from the processor to the memory controller coupled to the memory system also requires time, which increases the memory latency. Accordingly, the number of clock cycles required to access the DRAM memory has increased, from latencies (as measured in clock cycles) of a few clock cycles, through tens of clock cycles, to over a hundred processor clocks in modern computer systems.

Processors have implemented caches to combat the effects of memory latency on processor performance. Caches are relatively small, low latency memories incorporated into the processor or coupled nearby. The caches store recently used instructions and/or data under the assumption that the recently used information may be accessed by the processor again. The caches may thus reduce the effective memory latency experienced by a processor by providing frequently accessed information more rapidly than if the information had to be retrieved from the memory system in response to each access.

Some processors have further improved memory latencies and memory bandwidth available to the processor by using an integrated a memory controller. Similarly, devices such as graphics controllers may have integrated memory controllers for accessing local graphics memory. In such processors and devices, one way that the memory bandwidth may be more effectively utilized is to predict the information that is to be accessed and to prefetch that information from the system memory and to store the prefetched information in a local memory cache or buffer. If the prediction is correct, the information may be a cache hit at the time of the actual request and thus the effective memory latency for actual requests may be decreased. Accordingly, an aggressive prefetch mechanism may be desirable.

SUMMARY OF THE INVENTION

Various embodiments of a prefetch mechanism are disclosed. In one embodiment, the prefetch mechanism includes a prefetch predictor table coupled to a prefetch control. The prefetch predictor table may include a plurality of locations configured to store a plurality of entries each indicative of a stride between a respective pair of memory requests. For example, the pair of memory requests may include a new incoming memory request and a memory request received previous to the new memory request. Each of the plurality of entries may be stored in a respective one of the plurality of locations dependent upon a value of an earlier stride. The prefetch control may be configured to prefetch an address based upon a given one of the plurality of entries in the prefetch predictor table.

In one specific implementation, the prefetch control may be further configured to access a respective one of the locations dependent upon the value of the earlier stride and to compare the stride with a value of a current stride.

In another specific implementation, the prefetch predictor table may further include a second plurality of entries each corresponding to a respective one of the plurality of entries. Each of the second entries may include a count value indicative of a number of times the stride is equal to the value of the current stride.

In yet other specific implementations, the prefetch control may be further configured to increment the count value in response to the stride being equal to said value of said current stride and to decrement the count value in response to the stride not being equal to the value of the current stride. The prefetch control may be further configured to prefetch the address based upon accessing a first one of the locations dependent upon a value of the current stride and in response to the count value being greater than a first predetermined threshold.

Figure 1:
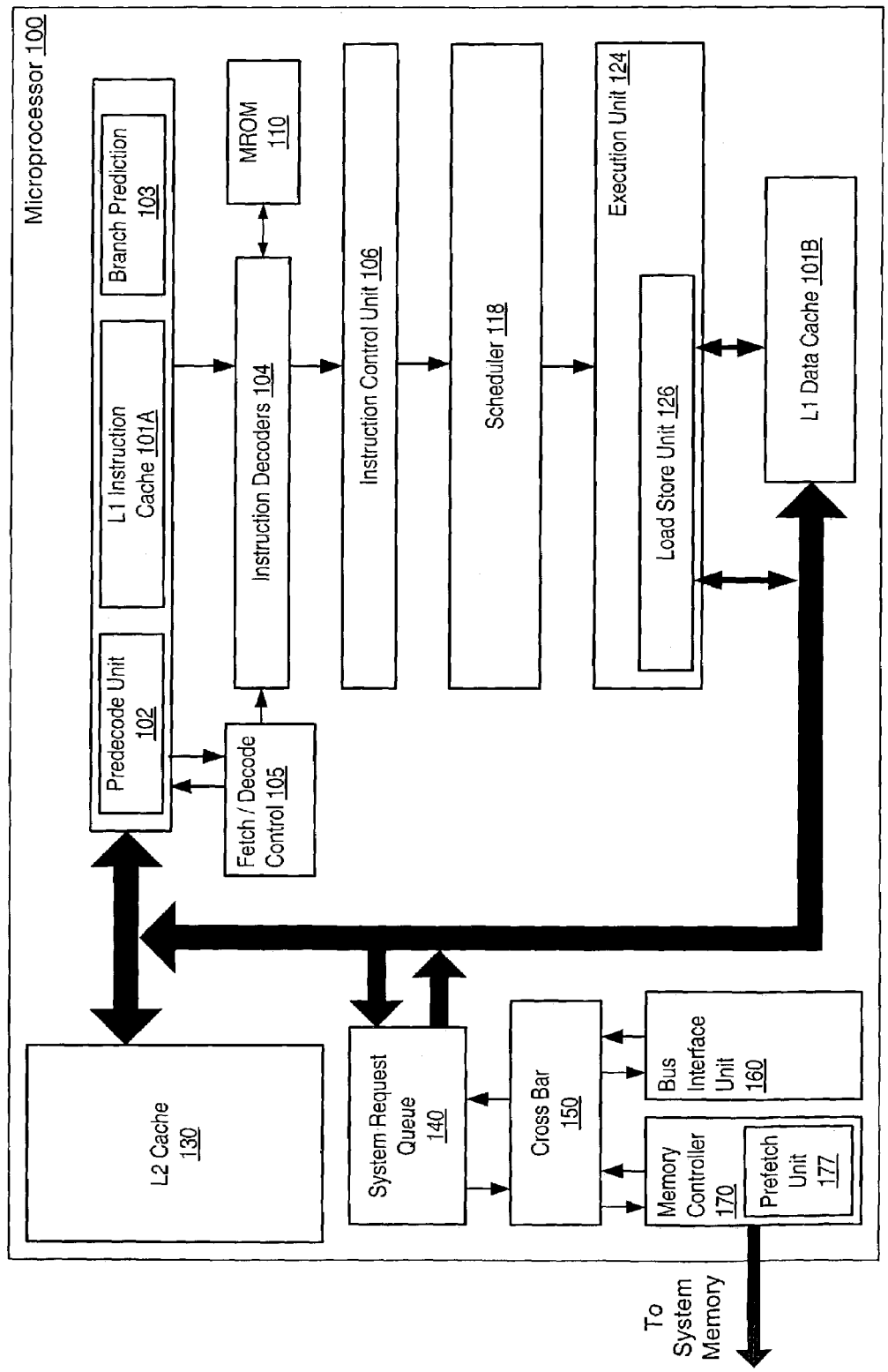
FIG. 1 is a block diagram of one embodiment of a microprocessor including an integrated memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of an exemplary microprocessor 100 including an integrated memory controller is shown. Microprocessor 100 is configured to execute instructions stored in a system memory (not shown in FIG. 1). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes a level one (L1) cache including an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache where appropriate. Microprocessor 100 also includes a pre-decode unit 102 and branch prediction logic 103 which may be closely coupled with instruction cache 101A. Microprocessor 100 also includes a fetch and decode control unit 105 which is coupled to an instruction decoder 104; both of which are coupled to instruction cache 101A. An instruction control unit 106 may be coupled to receive instructions from instruction decoder 104 and to dispatch operations to a scheduler 118. Further, instruction control unit 106 may be coupled to a microcode read-only memory (MROM) 110. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown) within instruction control unit 106. Microprocessor 100 also includes an on-chip L2 cache 130 which is coupled between instruction cache 101A, data cache 101B and the system memory. Further, microprocessor includes a system request queue 140 which is coupled to a crossbar 150, which is in turn coupled to a bus interface unit 160 and to a memory controller 170. System request queue 140 may be configured to manage requests from the core of microprocessor 100 as well as requests received via bus interface unit 160. Crossbar 150 may be configured to route command and data information between memory controller 170, bus interface unit 160, and system request queue 140.

Instruction cache 101A may store instructions before execution. Functions which may be associated with instruction cache 101A may be instruction loads, instruction prefetching, instruction pre-decoding and branch prediction. Instruction code may be provided to instruction cache 106 from the system memory through buffer interface unit 140 or from L2 cache 130. Instruction cache 101A may be implemented in various configurations (e.g., set-associative, fully-associative, or direct-mapped).

Instructions may be stored into instruction cache 101A by fetch/decode control 105. Instructions may be prefetched prior to the request thereof from instruction cache 101A in accordance with a prefetch scheme. As fetch/decode control 105 transfers instructions to instruction cache 101A, fetch/decode control 105 may generate predecode data corresponding to the instructions. For example, in one embodiment, fetch/decode control 105 may generate one or more predecode bits for each byte of the instructions. The predecode bits may form tags indicative of the boundaries of each instruction. The predecode tags may also convey additional information such as whether a given instruction can be decoded directly by instruction decoders 104 or whether the instruction is executed by invoking a microcode procedure controlled by MROM 110. Still further, fetch/decode control 105 may be configured to detect branch instructions and to store branch prediction information corresponding to the branch instructions into branch prediction unit 103. Other embodiments may employ any suitable predecode scheme or no predecode, as desired.

Instruction decoder 104 may be configured to decode instructions into operations which may be either directly decoded or indirectly decoded using operations stored within MROM 110. Instruction decoder 104 may decode certain instructions into operations executable within execution unit 124. Simple instructions may correspond to a single operation, while in other embodiments, more complex instructions may correspond to multiple operations. In one embodiment, instruction decoder 104 may include multiple decoders (not shown) for simultaneous decoding of instructions. As instructions are fetched from instruction cache 101A into instruction decoders 104, the corresponding pre-decode data may be scanned to provide information to the decoders and to MROM unit 110 regarding the instructions being fetched. Each instruction may be aligned and decoded into a set of control values in multiple stages depending on whether the instructions are first routed to MROM 110. These control values may be routed in an instruction stream to instruction control unit 106 along with operand address information and displacement or immediate data which may be included with the instruction.

Instruction control unit 106 may control dispatching of operations to the execution unit 124. In one embodiment, instruction control unit 106 may include a reorder buffer for holding operations received from instruction decoder 104. Further, instruction control unit 106 may be configured to control the retirement of operations.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking for load instructions against pending store instructions to ensure that data coherency is maintained.

Data cache 101B is a cache memory provided to store data being transferred between load/store unit 126 and the system memory. Similar to instruction cache 101A described above, data cache 1011B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. Similar to instruction cache 101A, in one embodiment data cache 101B may also be implemented in static random access memory (SRAM), although other embodiments are contemplated which may include other types of memory.

L2 cache 130 is also a cache memory and it may be configured to store instructions and/or data. In the illustrated embodiment, L2 cache 130 may be an on-chip cache and may be configured as either fully associative or set associative or a combination of both.

Bus interface unit 160 may include one or more interface units configured to provide a link from microprocessor 100 to an external input/output (I/O) device via a non-coherent I/O link, for example. In one embodiment, one such bus interface unit 160 may include a host bridge (not shown). In addition, bus interface unit 160 may provide links between microprocessor 1100 and other microprocessors via coherent links. In one embodiment, bus interface unit 160 may include an interface to any suitable interconnect structure, such as a packet-based interconnect compatible with HyperTransport™ Technology or a shared bus such as an EV-6 bus by Digital Equipment Corporation, for example.

Memory controller 170 is configured to manage memory requests to a system memory (not shown in FIG. 1). The memory requests may be from multiple sources. As will be described in greater detail below in conjunction with the description of FIG. 2 through FIG. 4, memory controller 170 includes a prefetch unit 177 configured to prefetch addresses. In one embodiment, prefetch unit 177 is a prefetch mechanism which may employ a prediction table (not shown in FIG. 1) to generate the prefetch addresses. Thus, by predicting and generating prefetch addresses for memory controller 170, the effective memory latencies associated with access to the system memory may be reduced.

In one embodiment, prefetch unit 177 may receive addresses from crossbar 150 which may originate within the core of microprocessor 100. Alternatively, prefetch unit 177 may receive addresses originating within an I/O device or a different microprocessor (both not shown in FIG. 1).

Figure 2:
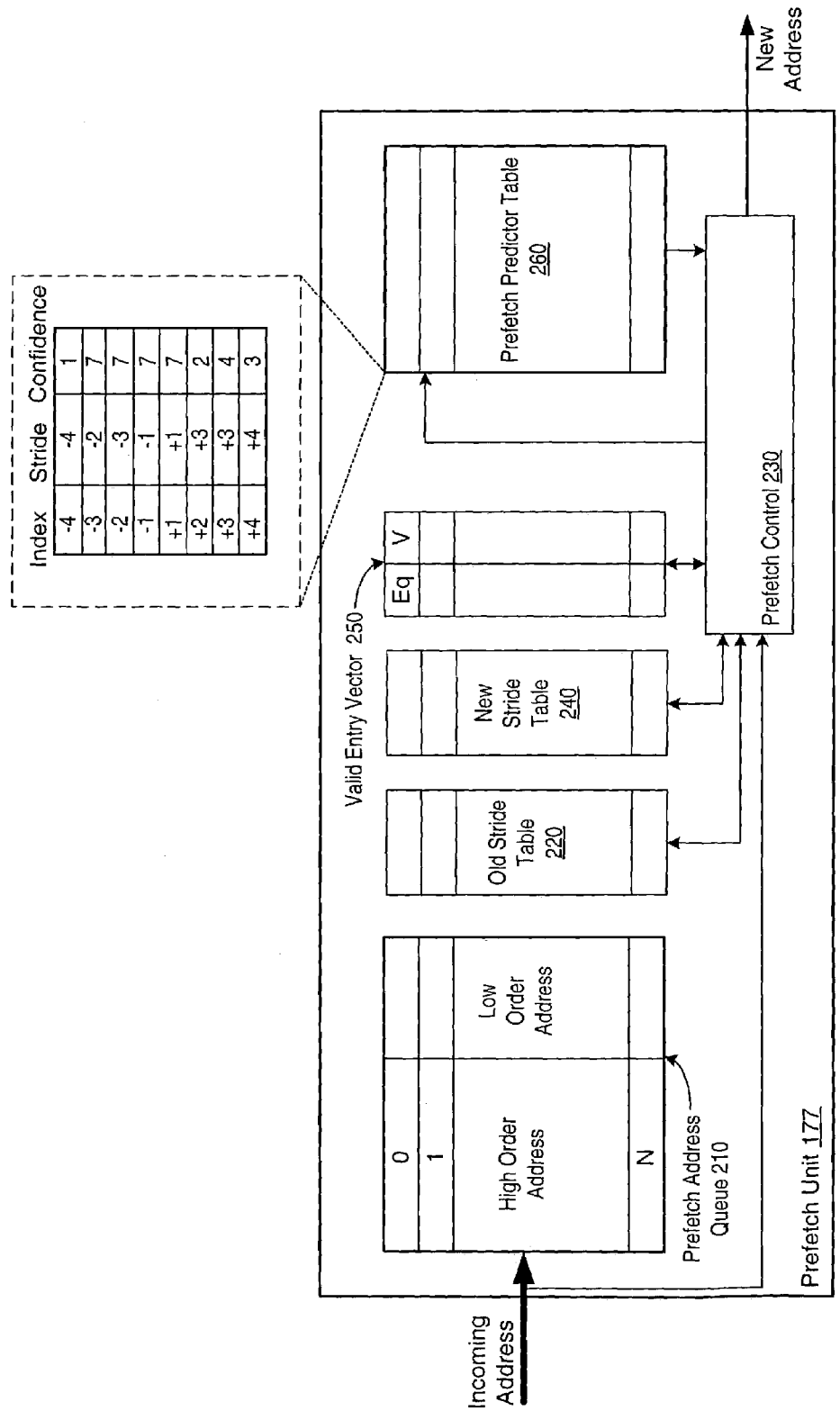
FIG. 2 is a block diagram of one embodiment of a prefetch unit.

Referring to FIG. 2, a block diagram of one embodiment of a prefetch unit is shown. Components corresponding to those shown in FIG. 1 are numbered identically for clarity and simplicity. Prefetch unit 177 includes a prefetch address queue 210 configured to receive and store addresses received from any source requesting memory accesses. Prefetch unit 177 also includes an old stride table 220 which includes respective entries which correspond to entries in prefetch address queue 210. In addition, prefetch unit 177 includes a prefetch control 230 coupled to control prediction and generation of prefetch addresses. Prefetch unit 177 includes a new stride table 240 and a valid entry vector 250 which are coupled to prefetch control 230. Further, prefetch unit 177 includes a prefetch predictor table 260 which is coupled to prefetch control 230.

Prefetch address queue 210 is configured to store a number of bits of N incoming memory request addresses, where N is any number of entries. The incoming addresses may be stored for later comparison operations by prefetch control 230. In the illustrated embodiment, the high order address bits may correspond to bits 39 through bits 12 of a memory address. Further, the low order address bits may correspond to bits 11 through six. It is noted that other embodiments are contemplated in which the delineation between the high and low order address bits may be different.

Each entry in new stride table 240 is configured to hold a value representing the difference between the low order address bits received in a current incoming address and the low order address bits of each corresponding entry in prefetch address queue 210. In one embodiment, new stride table 240 may be implemented using combinatorial outputs of logic (not shown) within prefetch control 230. However, it is contemplated that in another embodiment, new stride table 240 may be implemented using registers. In yet another embodiment, new stride table 240 may be implemented using a data structure stored in a memory. As used herein, a difference between any two addresses is referred to as a stride. The difference between the low order address bits received in a current incoming address and the low order address bits of each corresponding entry in prefetch address queue 210 is referred to as a "new stride" or a current stride.

Each entry in old stride table 220 is configured to store a value corresponding to the difference between the low order address bits of the previous incoming address and the low order address bits stored in each corresponding entry in prefetch address queue 210. In one embodiment, old stride table 220 may be implemented as a portion of prefetch address queue 210. In another embodiment, old stride table 220 may be implemented using a data structure separate from prefetch address queue 210. In yet another embodiment, old stride table 220 may be implemented using registers. The difference between the low order bits of the previous incoming address and the low order bits of the address stored within a corresponding entry of prefetch address queue 210 is referred to as an "old stride" or an earlier stride.

Valid entry vector 250 includes a plurality of entries. Each entry in valid entry vector 250 corresponds to one entry in prefetch address queue 210 and is configured to store a pair of bits. One bit of the pair of bits indicates whether the high order bits of a new incoming address matches (i.e., is equal to) the high order bits of the address stored within a corresponding entry of prefetch address queue 210. The other bit of the pair of bits indicates whether the new stride between the new incoming address and the address stored within a corresponding entry of prefetch address queue 210 is within a predetermined valid range. It is noted that alternative embodiments may track the validity or matching of the incoming address using any suitable storage mechanism, such as a register set or data structure, for example.

In the illustrated embodiment, prefetch predictor table 260 includes eight locations for storing eight entries, although other embodiments are contemplated in which other numbers of locations may be used. In the exploded view of FIG. 2, each entry in prefetch predictor table 260 includes an index value, a predicted stride value and a confidence value. The indices range from −4 to +4. This range corresponds to the range of valid new strides described above. This particular range is implementation specific and may be programmable in some embodiments. Each predicted stride value is entered into the table when its corresponding confidence value is zero. Each stride value may be indicative of the stride between a respective pair of memory request addresses. The stride value entered may be the new stride value for the current incoming address and a matching address within prefetch address queue 210. Each confidence value may be a counter value representative of how accurate the predicted stride value is over time. That is to say, the counter value may be indicative of how many times the predicted stride value in a corresponding entry is equal to the new stride each time the predictor table is accessed using the old stride during an update. It is noted that prefetch predictor table 250 may be implemented using any suitable storage mechanism. For example, in one embodiment, prefetch predictor table 260 may be may be implemented using registers. In yet another embodiment, prefetch predictor table 260 may be implemented using a data structure stored in a memory.

As will be described below in conjunction with the descriptions of FIG. 3A and FIG. 3B, prefetch control 230 may include logic (not shown) configured to perform functions associated with controlling the prediction and generation of prefetch addresses. For example, in one embodiment, prefetch control 230 may monitor the incoming addresses, calculate the new strides associated with the incoming address, perform comparisons of each entry in the address queue, populate valid entry vector 240, control updating prefetch predictor table 260 and predicting the prefetch addresses using prefetch predictor table 260.

Figure 3A:
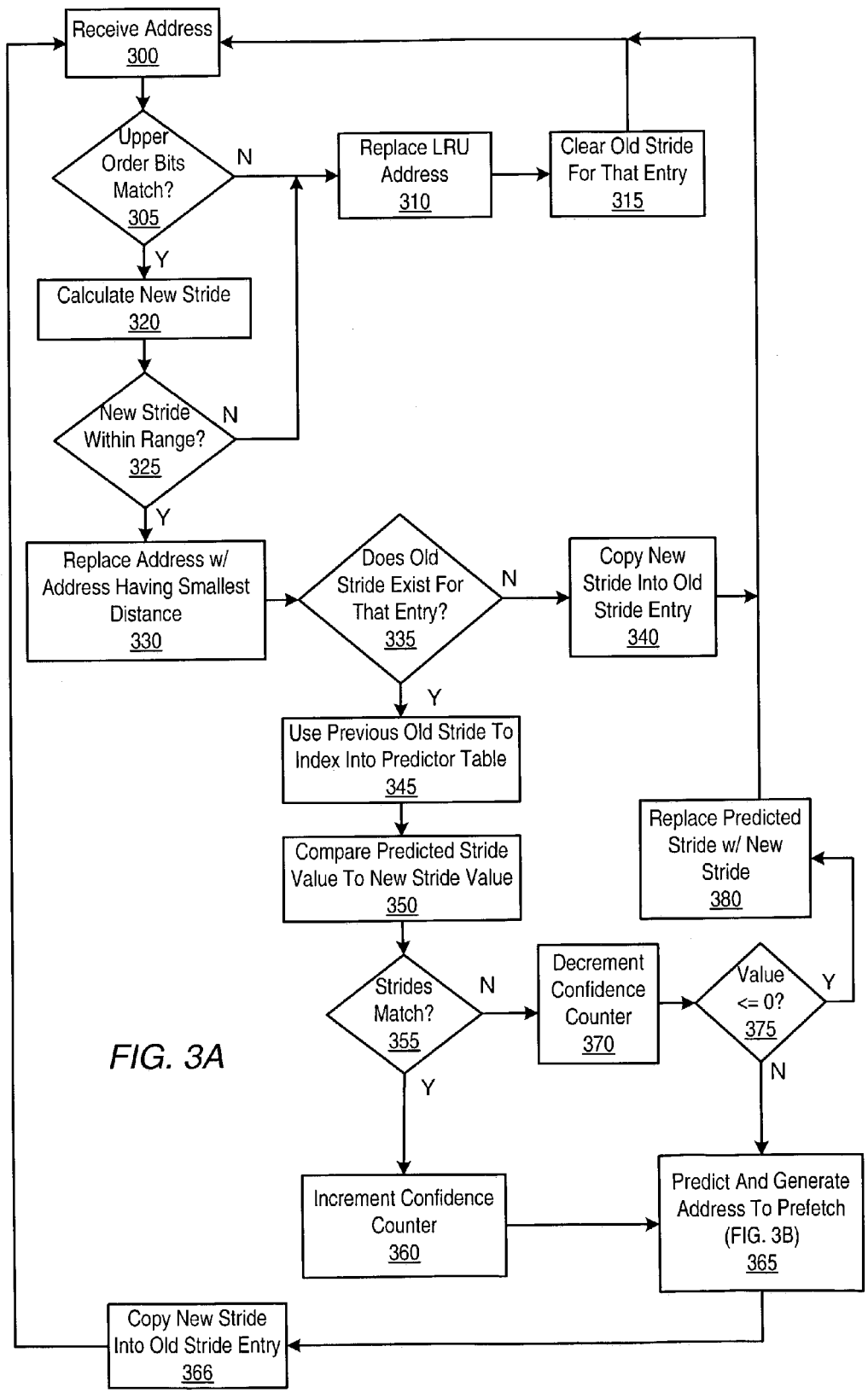
FIG. 3A and FIG. 3B are flow diagrams describing the operation of the embodiment of the prefetch unit illustrated in FIG. 2.
Figure 3B:
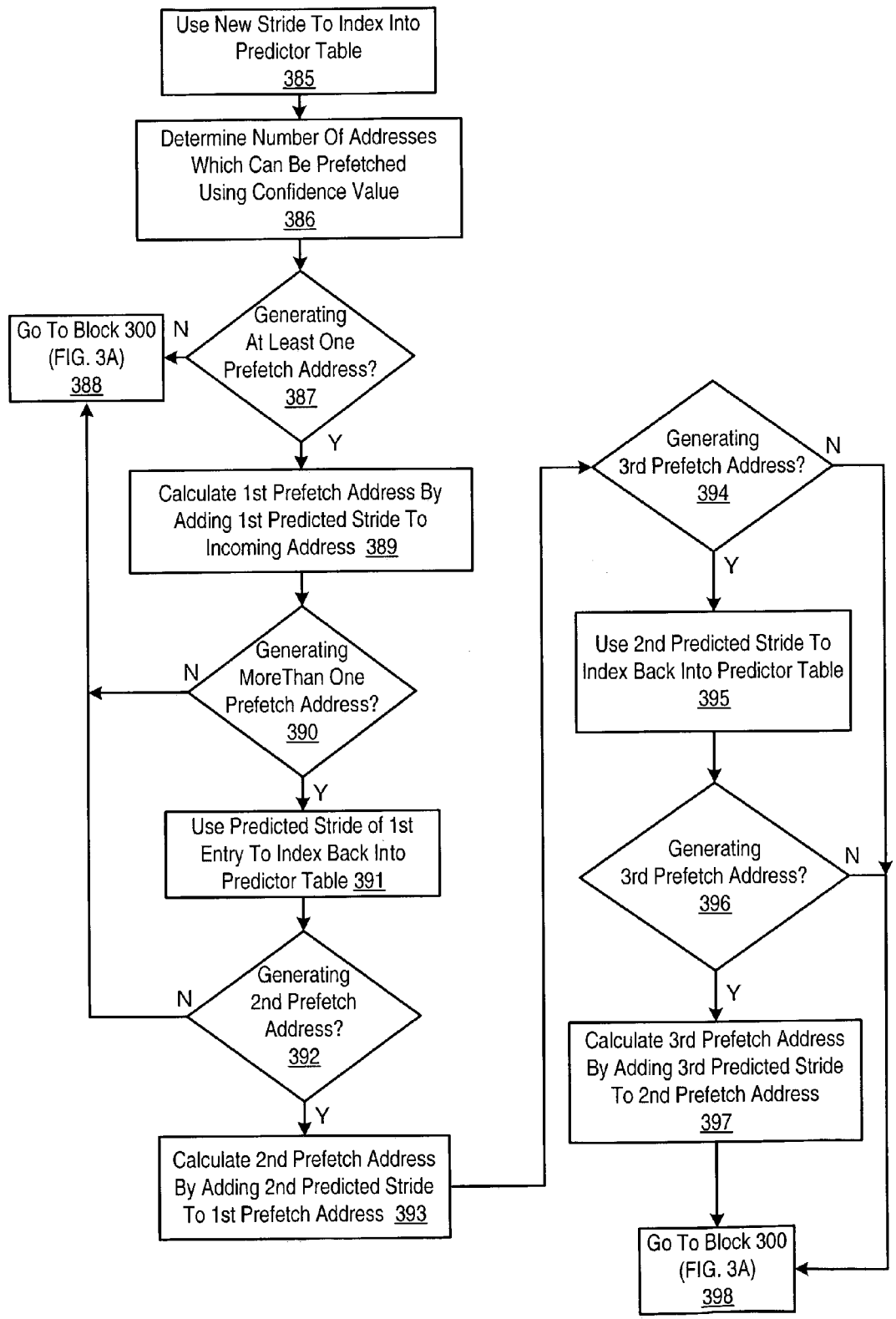

FIG. 3A and FIG. 3B describe the operation of one embodiment of a prefetch unit such as prefetch unit 177 of FIG. 2, for example. As will be described in greater detail below, prefetch unit 177 may be configured to predict and generate prefetch addresses. Prefetch unit 177 may monitor the received addresses to determine whether an address is part of a new address stream or an old address stream. Prefetch unit 177 may detect patterns in the address stream and predict the next address using a prediction table. Prefetch unit 177 may generate multiple prefetch addresses depending upon how accurately the patterns are predicted. More particularly, prefetch unit 177 may attempt to detect a stride access pattern among the received addresses and may generate the next address in the pattern if a strided access pattern is detected. A stride access pattern may exist if subsequent addresses in the pattern are separated by a particular stride amount. The particular amount need not be the same each time. For example, prefetch unit 177 may be configured to detect and predict odd address streams such as strides of +1, +2, +1, +2 and so forth. Thus in this example, the prefetch addresses may be A, A+1, A+3, A+4, A+6 . . . Each next prefetch address in the pattern may be generated by adding successive predicted stride values to the most recently generated prefetch address in the pattern.

FIG. 3A generally describes the updating of prefetch predictor table 260 as a new incoming address is received. Referring collectively to FIG. 2 and FIG. 3A, prefetch address queue 210 of prefetch unit 177 receives a new incoming address (block 300). Prefetch control 230 compares the high order bits of the new incoming address with the high order address bits of each entry in prefetch address queue 210 (block 305). If there is no match, the least recently used entry within prefetch address queue 210 is replaced with the new incoming address (block 310). The old stride value in the old stride table 220 corresponding to the replaced entry is cleared (block 315). Operation proceeds back to block 300 to await another incoming address.

If the high order bits of the new incoming address match with the high order bits of any entry in prefetch address queue 210 (block 305), as described above prefetch control 230 calculates the new stride for each entry having matching high order bits (block 320). Prefetch control 230 compares the new stride of each entry having matching high order bits to a predetermined range (block 325). In one embodiment, the range is −4 to +4. If there are no new strides within the predetermined range, the least recently used entry within prefetch address queue 210 is replaced as described above at block 310.

If there are new strides within the predetermined range, the entry within prefetch address queue 210 having the smallest prefetch distance is replaced with the new incoming address (block 330).

Prefetch control 230 checks old stride table 220 for any old stride information corresponding to the matching entry (block 335). If no old stride information exists in the entry corresponding to the matching entry, old stride table 220 is updated and the new stride information is copied into the entry within old stride table 220 (block 340). Operation proceeds back to block 300 to await another incoming address.

If however, old stride information exists in the old stride table entry corresponding to the matching entry, this old stride value is used to update prefetch predictor table 260. Prefetch control 230 uses the old stride value as an index into prefetch predictor table 260 (block 345). Prefetch control 230 compares the predicted stride value at the indexed entry with the calculated new stride value (block 350). If there is not a match (block 355), the confidence value for that entry is decremented by one count (block 370). If the confidence value is equal to or less than zero (block 375), the predicted stride value in that entry of prefetch predictor table 260 is replaced with the calculated new stride value (block 380). For example, if the old stride value in the illustrated embodiment is +2. Using +2 to index into prefetch predictor table 260, the predicted stride value in that entry is +3. If the new stride value is not +3 there is no match and prefetch control 230 would decrement the confidence value from 2 to 1. In addition, the entry within old stride table 220 corresponding to the entry in prefetch address queue 210 is updated with the new stride value. Operation proceeds back to block 300 to await another incoming address.

However, if the new stride value is +3 and there is a match (block 355), the confidence value for that entry is incremented from 2 to 3 (block 360). Prefetch predictor table 260 is now in an updated state.

As will be described in greater detail below in conjunction with the description of FIG. 3B, once prefetch predictor table 260 has been updated, prefetch control 230 may use prefetch predictor table 260 to predict and generate prefetch addresses dependent upon the confidence of a given entry (block 365). Prior to starting a new cycle, the entry the new stride value is copied into the corresponding entry within old stride table 220 (block 366). Operation proceeds back to block 300 to await another incoming address.

Referring collectively to FIG. 2 through FIG. 3B, prefetch control 230 uses the new stride value as an index into prefetch predictor table 260 (block 385). Prefetch control 230 determines the number of addresses to prefetch (if any) based upon the confidence value of the indexed entry (block 386). Thus, the confidence value of a given entry may be compared against one or more prefetch threshold values. In one embodiment, one or more predetermined thresholds may be used to determine if the confidence value is high enough to prefetch addresses. For example, a confidence table (not shown) or other structure holding predetermined confidence values may be compared to the confidence value in the indexed entry of prefetch predictor table 260. In one embodiment, if the confidence value is greater than 1, one address may be prefetched. If the confidence value is greater than or equal to 5, two addresses may be prefetched and if the confidence value is equal to 7, three addresses may be prefetched. A prefetch address counter (not shown) may be used to indicate how many addresses may be prefetched based upon this $1^{st}$ confidence value. It is noted that in other embodiments, other threshold values may be used and other numbers of addresses may be prefetched.

If the $1^{st}$ confidence value is too low and no addresses will be prefetched (block 387), operation proceeds back to block 300 of FIG. 3A (block 388). However, if the $1^{st}$ confidence value is high enough (e.g., greater than 1) for at least one address to be prefetched (block 387), prefetch control 260 calculates the $1^{st}$ prefetch address by adding the predicted stride value in prefetch predictor table 260 to the incoming address (block 389). In one embodiment the $1^{st}$ prefetch address may be issued to a memory controller such as memory controller 170 of FIG. 1. This address may be stored in a local or remote DRAM controller address queue (not shown).

If the $1^{st}$ confidence value was not high enough (e.g., less than 5) to allow more than one prefetch address to be generated (block 390), operation proceeds back to block 300 of FIG. 3A (block 388). If the $1^{st}$ confidence value was high enough to allow more than one prefetch address to be generated (block 390), prefetch control 230 uses the $1^{st}$ predicted stride value to index back into prefetch predictor table 260 (block 391).

If the confidence value of the $2^{nd}$ indexed entry is too low (e.g., not greater than 1) for at least a $2^{nd}$ address to be prefetched (block 392), operation proceeds back to block 300 of FIG. 3A (block 388). If the confidence value of the $2^{nd}$ indexed entry is high enough for at least a $2^{nd}$ address to be prefetched (block 392), prefetch control 230 calculates the $2^{nd}$ prefetch address by adding the predicted stride value in the $2^{nd}$ indexed entry in prefetch predictor table 260 to the calculated $1^{st}$ prefetch address (block 393). As described above, in one embodiment the $2^{nd}$ prefetch address may be issued to a memory controller such as memory controller 170 of FIG. 1.

If the $2^{nd}$ confidence value was too low (e.g., less than 5) for a $3^{rd}$ address to be prefetched (block 394), operation proceeds back to block 300 of FIG. 3A (block 398). If the $2^{nd}$ confidence value was high enough for a $3^{rd}$ address to be prefetched (block 394), prefetch control 230 uses the $2^{nd}$ predicted stride value to index back into prefetch predictor table 260 (block 395).

If the confidence value of the $3^{rd}$ indexed entry is too low (e.g., not greater than 1) for at least a $3^{rd}$ address to be prefetched (block 396), operation proceeds back to block 300 of FIG. 3A (block 398). If the confidence value of the $3^{rd}$ indexed entry is high enough for at least a $3^{rd}$ address to be prefetched (block 396), prefetch control 230 calculates the $3^{rd}$ prefetch address by adding the predicted stride value of the $3^{rd}$ indexed entry in prefetch predictor table 260 to the calculated $2^{nd}$ prefetch address (block 397). As described above, in one embodiment the $3^{rd}$ prefetch address may be issued to a memory controller such as memory controller 170 of FIG. 1. This completes the three prefetch addresses and operation proceeds back to block 300 of FIG. 3A (block 398).

It is noted that although the illustrated embodiment of FIG. 3A described above includes only three prefetch addresses, other embodiments are contemplated in which any suitable number of addresses may be prefetched. Accordingly, such embodiments may include similar additional blocks in a flow diagram.

To illustrate by example, refer to FIG. 3B and to the exploded view of prefetch predictor table of FIG. 2. An incoming address A matches in prefetch address queue 210 and has a new stride of −2. Assuming prefetch predictor table 260 has been updated, prefetch control 230 uses the new stride value of −2 to index into prefetch predictor table 260. The entry at the −2 index has a predicted stride of −3 and a confidence value of 7. Thus for this example, a confidence of 7 is indicative that up to three prefetch addresses may be generated. Prefetch control 230 generates the $1^{st}$ prefetch address (A−3) and since up to two more prefetch addresses may be generated, prefetch control 230 uses the predicted stride of −3 to index back into prefetch predictor table 260. The entry at the −3 index has a predicted stride of −2 and a confidence value of 7. Thus for this example, in addition to a confidence of 7 being high enough to generate the $2^{nd}$ prefetch address, at least one more prefetch address may be generated. Prefetch control 230 generates the $2^{nd}$ prefetch address ((A−3)−2) and uses the predicted stride of −2 to index back into prefetch predictor table 260. Again, the entry at the −2 index has a predicted stride of −3 and a confidence of 7. Thus for this example, a confidence of 7 is indicative that the 3rd prefetch address may be generated. Prefetch control 230 generates the 3rd prefetch address (((A−3)−2)−3). Thus for this example, the sequence of addresses sent to a memory controller may be A, A−3, A−5, A−8. The corresponding stride sequence is −3,−2,−3, etc. . . .

Figure 4:
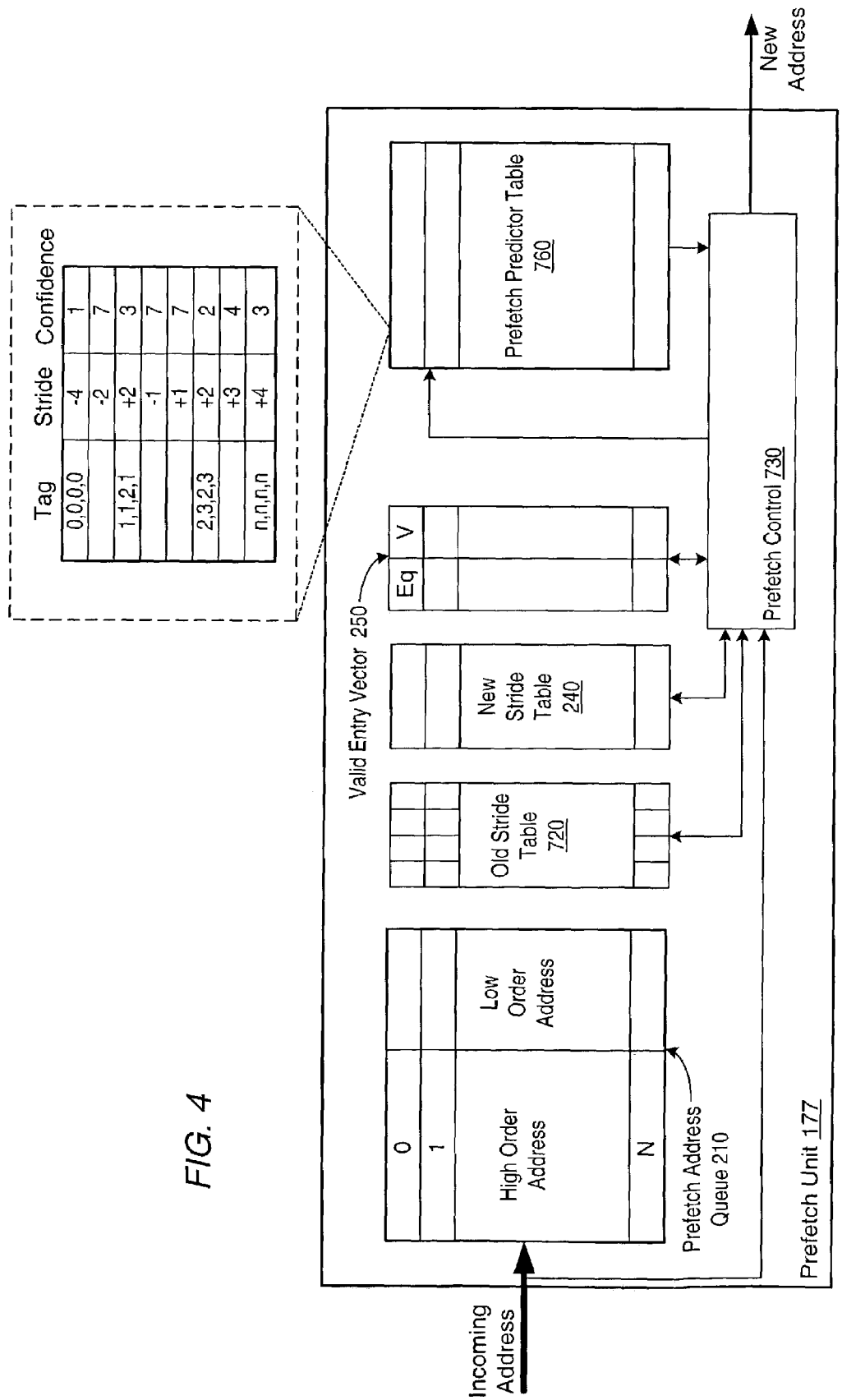
FIG. 4 is a block diagram of another embodiment of a prefetch unit.

Referring to FIG. 4, a block diagram of another embodiment of a prefetch unit is shown. Components corresponding to those shown in FIG. 1 and FIG. 2 are numbered identically for clarity and simplicity. Prefetch unit 177 includes a prefetch address queue 210 configured to receive and store addresses received from any source requesting memory accesses. Prefetch unit 177 also includes an old stride table 720 which includes respective entries which correspond to entries in prefetch address queue 210. In addition, prefetch unit 177 includes a prefetch control 730 coupled to control prediction and generation of prefetch addresses. Prefetch unit 177 includes a new stride table 240 and a valid entry vector 250 which are coupled to prefetch control 230. Further, prefetch unit 177 includes a prefetch predictor table 760 which is coupled to prefetch control 230.

In the illustrated embodiment, prefetch address queue 210 is configured to store a number of bits of incoming memory request addresses, where N is any number of entries. The incoming addresses may be stored for later comparison operations by prefetch control 230. In the illustrated embodiment, the high order address bits may correspond to bits 39 through bits 12 of a memory address. Further, the low order address bits may correspond to bits 11 through six. It is noted that other embodiments are contemplated in which the delineation between the high and low order address bits may be different.

Each entry in new stride table 240 is configured to hold a value representing the difference between the low order address bits received in a current incoming address and the low order address bits of each corresponding entry in prefetch address queue 210. In one embodiment, new stride table 240 may be implemented using combinatorial outputs of logic (not shown) within prefetch control 730. However, it is contemplated that in another embodiment, new stride table 240 may be implemented using registers. In yet another embodiment, new stride table 240 may be implemented using a data structure stored in a memory. As used herein, a difference between any two addresses is referred to as a stride. The difference between the low order address bits received in a current incoming address and the low order address bits of each corresponding entry in prefetch address queue 210 is referred to as a "new stride" or a current stride.

In the illustrated embodiment, each entry in old stride table 720 is configured to store up to four stride values corresponding to the difference between the low order address bits of the last four previous incoming addresses and the low order address bits stored in each corresponding entry in prefetch address queue 210. In one embodiment, old stride table 720 may be implemented as a portion of prefetch address queue 210. In another embodiment, old stride table 720 may be implemented using a data structure separate from prefetch address queue 210. In yet another embodiment, old stride table 720 may be implemented using registers. The difference between the low order bits of the previous incoming address and the low order bits of the address stored within a corresponding entry of prefetch address queue 210 is referred to as an "old stride" or an earlier stride. Thus, the four values of one entry of old stride table 720 may be referred to as an old stride history value.

Valid entry vector 250 includes a plurality of entries. Each entry in valid entry vector 250 corresponds to one entry in prefetch address queue 210 and is configured to store a pair of bits. One bit of the pair of bits indicates whether the high order bits of a new incoming address matches (i.e., is equal to) the high order bits of the address stored within a corresponding entry of prefetch address queue 210. The other bit of the pair of bits indicates whether the new stride between the new incoming address and the address stored within a corresponding entry of prefetch address queue 210 is within a predetermined valid range. It is noted that alternative embodiments may track the validity or matching of the incoming address using any suitable storage mechanism, such as a register set or data structure, for example.

In the illustrated embodiment, prefetch predictor table 760 includes n locations for storing n entries, where n may be any number. In one embodiment, n may be 16 locations although other embodiments may include other numbers. In the exploded view of FIG. 4, each entry in prefetch predictor table 760 includes a tag value, a predicted stride value and a confidence value. In contrast to prefetch predictor table 260 of FIG. 2 which used a fixed index value for each entry, prefetch predictor table 760 employs a tag value for each entry which may change as described below. Prefetch predictor table 760 may be indexed using the tag values in a fully associative manner. Prefetch predictor table 760 may be indexed using the old stride history values stored in old stride table 720 during an update sequence and by stride history values amended with the new stride value during a lookup and prefetch sequence. Each tag value includes four values which correspond to stride history values. Each predicted stride value is entered into the table when its corresponding confidence value is zero. Each predicted stride value may be indicative of the stride between a respective pair of memory request addresses. The stride value entered may be the new stride value for the current incoming address and a matching address within prefetch address queue 210. Each confidence value may be a counter value representative of how accurate the predicted stride value is over time. That is to say, the counter value may be indicative of how many times the predicted stride value in a corresponding entry is equal to the new stride each time the predictor table is accessed using the old stride history values during an update. It is noted that prefetch predictor table 760 may be implemented using any suitable storage mechanism. For example, in one embodiment, prefetch predictor table 760 may be may be implemented using registers. In yet another embodiment, prefetch predictor table 760 may be implemented using a data structure stored in a memory.

Similar to prefetch control 230 of FIG. 2, prefetch control 730 of FIG. 3 may include logic (not shown) configured to perform functions associated with controlling the prediction and generation of prefetch addresses. For example, in one embodiment, prefetch control 730 may monitor the incoming addresses, calculate the new strides associated with the incoming address, perform comparisons of each entry in the address queue, populate valid entry vector 240, control updating prefetch predictor table 760 and predicting the prefetch addresses using prefetch predictor table 760.

During operation, in contrast to the above description of FIG. 2, prefetch predictor table 760 of FIG. 3 may not be updated unless four valid stride history values are present in a given entry of old stride table 720. However, if a single valid stride history value is present in a given entry of old stride table 720, prefetch predictor table 760 may be accessed to perform a prefetch dependent upon the confidence level.

During an update sequence, prefetch predictor table 760 may be indexed using a given entry from old stride table 720. For example, the old stride entry is 2,2,3,2 and the new stride is 3. The update would be made at 2,2,3,2, where the stride value is compared with the new stride value of 3. If there is a stride value match, the confidence level is incremented and if there is no a match, the confidence level is decremented. If there is no tag value matching the old stride history value, a new entry having the old stride history value is created within prefetch predictor table 760. If all entries are currently occupied, an existing entry is replaced using a replacement algorithm. In one embodiment, a least recently used entry may be replaced, while in another embodiment an entry with the lowest confidence level may be replaced. However, it is contemplated that other embodiments may use other replacement algorithms.

As described above, as few as one valid old stride history value need be present to perform a lookup for a prefetch. For example, a given entry in old stride table 720 is x,x,x,2, where x is an unknown value and the new stride value is 1. Prefetch predictor table 760 would not be updated but a lookup of x,x,2,1 may still be made to see if a prefetch may be performed. In this case, if there is a match on x,x,2,1 having a stride value of 2, then a prefetch may be made having an address of the incoming address +2. In addition, and as described above, depending on the confidence level of the entry, a subsequent lookup into prefetch predictor table 760 may be made to x,2,1,2 to perform a subsequent prefetch.

Continuing with an example of a prefetch lookup using the four valid old stride history values from the update sequence above, the old stride history value is 2,2,3,2 and the new stride is 3. After the update, a lookup is performed for tag value 2,3,2,3. If the entry exists, the stride value in that entry is used to generate a prefetch address dependent upon the confidence level. Further, dependent on the confidence level, the stride value in that entry is also used to create the next index value into prefetch predictor table 760, as described above. For example, if the stride value in that entry is 1, the index used to form a new lookup is 3,2,3,1.

As described above in conjunction with the description of FIG. 2, any number of prefetches may be made dependent upon the confidence level of each entry and any thresholds which may be set.

Figure 5:
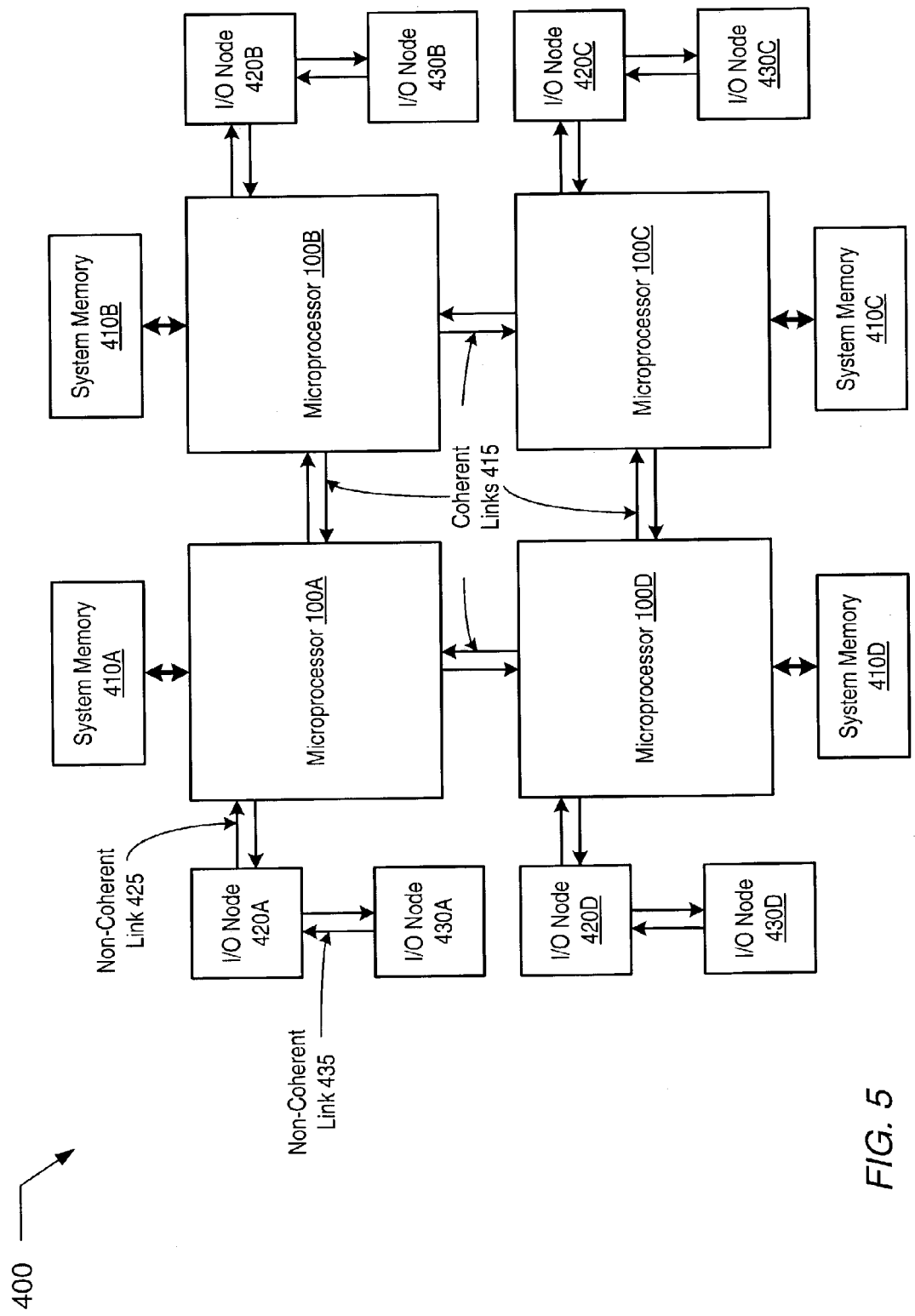
FIG. 5 is a block diagram of one embodiment of a computer system.

Turning to FIG. 5, a block diagram of one embodiment of a multiprocessor computer system including the microprocessor of FIG. 1 is shown. Components that correspond to those shown in FIG. 1, FIG. 2 and FIG. 4 are numbered identically for clarity and simplicity. Computer system 400 includes four microprocessors, designated 100A through 100D. Each of microprocessors 100A–D are coupled to a respective system memory 410A–D. In addition, each of microprocessors 100A–D are coupled to an I/O node 420A–D, respectively via respective non-coherent I/O links 425. Further, each of microprocessors 100A–D is coupled together via coherent links 415. It is noted that although four microprocessors are shown, other embodiments are contemplated which may include other numbers of microprocessors.

In the illustrated embodiment, each of microprocessors 100A–D may include an integrated memory controller 170 having a prefetch unit 177 as described above in conjunction with the descriptions of FIG. 1–FIG. 4. Further, in one embodiment, each of microprocessors 100A–D may include bus interface units 160 (not shown in FIG. 5) configured to provide links to other processors and to I/O nodes via coherent and non-coherent protocols, respectively. For example, microprocessor 100A–D may include a bus interface 160 for each coherent link 415 and for each non-coherent link 425. In one embodiment, the bus interface 160 coupled to non-coherent link 425 may include a host bridge (not shown). It is noted that in one embodiment, coherent links 415 and non-coherent links 425 and 435 may each be compatible with HyperTransport™ technology.

In the illustrated embodiment, system memory 410A–D may include any suitable memory devices. For example, system memory 410A–D may be implemented in any of the dynamic random access memory (DRAM) family of technologies. Further system memory 410A–D may employ one or more memory modules (not shown) which may plug into a motherboard (not shown) having sockets configured to accept the memory modules. The memory modules may include a plurality of memory integrated circuits (not shown) configured to store data. In one embodiment, the memory integrated circuits may be double data rate synchronous DRAM (DDRSDRAM) chips, although other embodiments are contemplated in which other types of memory chips may be used.

In the illustrated embodiment, I/O nodes 420A–D and I/O nodes 430A–D may be representative of any of a variety of I/O devices capable of bridging peripheral devices to non-coherent links 425 and 435. Further, I/O nodes 420A–D and I/O nodes 430A–D may also be configured to provide graphics capabilities as well as providing links to other networks via connections such as Ethernet connections, for example.

Figure 6:
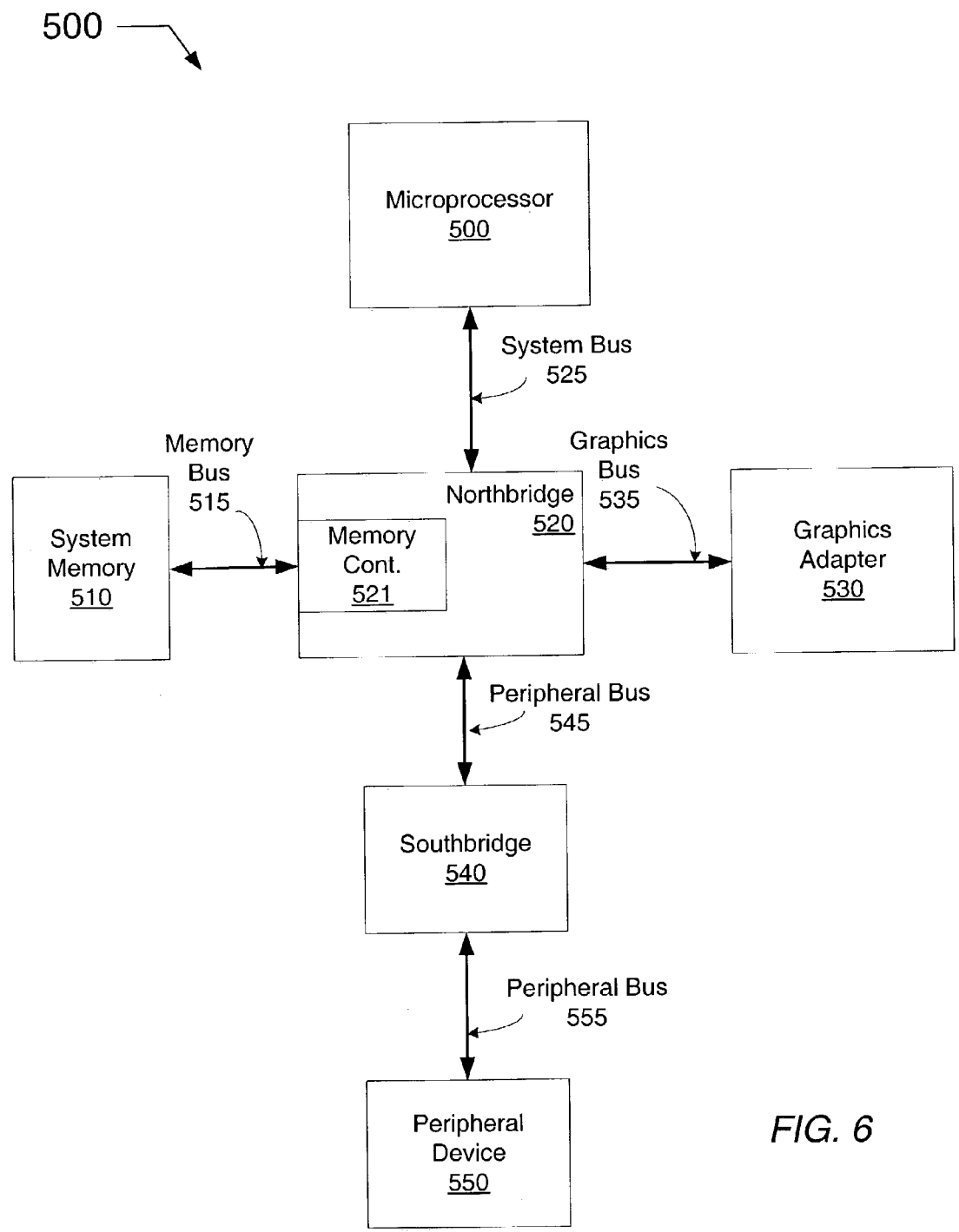
FIG. 6 is a block diagram of another embodiment of a computer system.

Turning to FIG. 6, a block diagram of another embodiment of a computer system is shown. Computer system 500 includes a microprocessor 500 coupled to a Northbridge device 520 via a system bus 525. Northbridge 520 is coupled to a graphics adapter 530 via a graphics bus 535. In addition, Northbridge 520 is coupled to a system memory 510 via a memory bus 515. Northbridge 520 is also coupled to a Southbridge 540 via a peripheral bus 545. Southbridge 540 is coupled to a peripheral device 550 via a peripheral bus 555.

In the illustrated embodiment, Northbridge 520 is coupled to system memory 510 via memory bus 515. Northbridge 520 includes a memory controller 521 as described above in conjunction with the description of FIG. 1–FIG. 4 for controlling accesses to system memory 510. Specifically, in one embodiment, the memory controller 521 of Northbridge 520 may include a prefetch unit configured to generate prefetch addresses using a prediction table as illustrated in FIG. 2 and FIG. 4. System memory 510 may include any suitable memory devices. For example, in one embodiment, system memory may include one or more banks of dynamic random access memory (DRAM) devices. Although it is contemplated that other embodiments may include other memory devices and configurations.

In the illustrated embodiment, Northbridge 520 is coupled to a graphics bus 535, a peripheral bus 545 and a system bus 525. Accordingly, Northbridge 520 may further include a variety of bus interface logic (not shown) which may include buffers and control logic for managing the flow of transactions between the various buses. In one embodiment, system bus 525 may be a packet based interconnect compatible with the HyperTransport™ technology. In such an embodiment, I/O node 520 may be configured to handle packet transactions. In alternative embodiments, system bus 525 may be a typical shared bus architecture such as a front-side bus (FSB) or an EV-6 bus by Digital Equipment Corporation, for example.

In one embodiment, graphics bus 535 may be compatible with accelerated graphics port (AGP) technology. In addition, graphics adapter 530 may be any of a variety of graphics devices configured to generate graphics images for display. In one embodiment, graphics adapter 530 may include a local frame buffer memory (not shown). In such an embodiment, graphics adapter 530 may also include a graphics memory controller (not shown) for controlling accesses to the graphics memory by graphics adapter 530. Such a graphics controller may include a prefetch unit such as prefetch unit 177 of FIG. 1, FIG. 2 and FIG. 4.

Southbridge 540 may also include a variety of bus interface logic (not shown) which may include buffers and control logic for managing the flow of transactions between peripheral bus 545 and peripheral bus 555. Peripheral bus 545 may be an example of a common peripheral bus such as a peripheral component interconnect (PCI) bus, for example. Peripheral bus 555 may be an example of another common peripheral bus such as an industry standard architecture (ISA) bus, for example. Peripheral device 540 may any type of peripheral device such as a modem or sound card, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A prefetch mechanism comprising:
a prefetch predictor table including a plurality of locations configured to store a first plurality of entries each indicative of a stride between a respective pair of memory requests, wherein each of said first plurality of entries is stored in a respective location of said plurality of locations dependent upon a value of an earlier stride;
wherein said prefetch predictor table further includes a second plurality of entries each corresponding to a respective one of said first plurality of entries, wherein each of said second plurality of entries includes a count value indicative of a number of times said stride between a respective pair of memory requests is equal to said value of said current stride;
a prefetch control coupled to said prefetch predictor table and configured to access a first location of said plurality of locations dependent upon a value of a current stride and to prefetch an address based upon a given one of said first plurality of entries stored within the first location in response to said count value stored within the first location being greater than a first predetermined threshold.

2. The prefetch mechanism as recited in claim 1 further comprising an address queue configured to store addresses associated with received memory requests.

3. The prefetch mechanism as recited in claim 1, wherein said prefetch control is further configured to access a respective one of said plurality of locations dependent upon said value of an earlier stride and to compare said stride between a respective pair of memory requests with a value of a current stride.

4. The prefetch mechanism as recited in claim 3, wherein said prefetch control is further configured to increment said count value in response to said stride between a respective pair of memory requests being equal to said value of said current stride.

5. The prefetch mechanism as recited in claim 3, wherein said prefetch control is further configured to decrement said count value in response to said stride between a respective pair of memory requests not being equal to said value of said current stride.

6. The prefetch mechanism as recited in claim 3, wherein said prefetch control is further configured to replace said stride between a respective pair of memory requests with said value of said current stride in response to said count value being equal to zero.

7. The prefetch mechanism as recited in claim 1, wherein said prefetch control is further configured to prefetch a second address based upon accessing a second location of said plurality of locations dependent upon a stride value stored in said first location of said plurality of locations and in response to said count values stored within said first location and said second location being greater than or equal to a second predetermined threshold.

8. The prefetch mechanism as recited in claim 7, wherein said prefetch control is further configured to prefetch a third address based upon accessing a third location of said plurality of locations dependent upon a stride value stored in said second location of said plurality of locations and in response to said count values stored within said second location and said third location being greater than or equal to a third predetermined threshold.

9. A method of prefetching addresses comprising:
storing a first plurality of entries each indicative of a stride between a respective pair of memory requests within a plurality of locations of a prefetch predictor table, wherein each of said first plurality of entries is stored in a respective location of said plurality of locations dependent upon a value of an earlier stride;
storing a second plurality of entries each corresponding to a respective one of said first plurality of entries, wherein each of said second plurality of entries includes a count value indicative of a number of times said stride between a respective pair of memory requests is equal to said value of said current stride;
accessing a first location of said plurality of locations dependent upon a value of a current stride; and
prefetching an address based upon a given one of said plurality of entries stored within the first location in response to said count value stored within the first location being greater than a first predetermined threshold.

10. The method as recited in claim 9 further comprising storing addresses associated with received memory requests within an address queue.

11. The method as recited in claim 9 further comprising accessing a respective one of said plurality of locations dependent upon said value of an earlier stride and comparing said stride between a respective pair of memory requests with a value of a current stride.

12. The method as recited in claim 11 further comprising storing a count value within each of a second plurality of entries of said prefetch predictor table, wherein said count value is indicative of a number of times said stride between a respective pair of memory requests is equal to said value of said current stride wherein each of said second plurality of entries corresponds to a respective one of said plurality of entries.

13. The method as recited in claim 12 further comprising incrementing said count value in response to said stride between a respective pair of memory requests being equal to said value of said current stride.

14. The method as recited in claim 12 further comprising decrementing said count value in response to said stride between a respective pair of memory requests not being equal to said value of said current stride.

15. The method as recited in claim 12 further comprising replacing said stride between a respective pair of memory requests with said value of said current stride in response to said count value being equal to zero.

16. The method as recited in claim 9, further comprising prefetching a second address based upon accessing a second location of said plurality of locations dependent upon a stride value stored in said first location of said plurality of locations and in response to said count values stored within said first location and said second location being greater than or equal to a second predetermined threshold.

17. The method as recited in claim 16 further comprising prefetching a third address based upon accessing a third location of said plurality of locations dependent upon a stride value stored in said second location of said plurality of locations and in response to said count values stored within said second location and said third location being greater than or equal to a third predetermined threshold.

18. A processor comprising:
a memory controller configured to control accesses to a system memory, wherein said memory controller includes a prefetch mechanism comprising:
a prefetch predictor table including a plurality of locations configured to store a first plurality of entries each indicative of a stride between a respective pair of memory requests, wherein each of said plurality of entries is stored in a respective location of said plurality of locations dependent upon a value of an earlier stride;
wherein said prefetch predictor table further includes a second plurality of entries each corresponding to a respective one of said first plurality of entries, wherein each of said second plurality of entries includes a count value indicative of a number of times said stride between a respective pair of memory requests is equal to said value of said current stride; and
a prefetch control coupled to said prefetch predictor table and configured to access a first location of said plurality of locations dependent upon a value of a current stride and to prefetch an address based upon a given one of said first plurality of entries stored within the first location in response to said count value stored within the first location being greater than a first predetermined threshold.

19. A computer system comprising:
a system memory configured to store instructions and data; and a processor coupled to execute said instructions, wherein said processor includes a memory controller configured to control accesses to said system memory, wherein said memory controller includes a prefetch mechanism comprising:
   a prefetch predictor table including a plurality of locations configured to store a first plurality of entries each indicative of a stride between a respective pair of memory requests, wherein each of said plurality of entries is stored in a respective location of said plurality of locations dependent upon a value of an earlier stride;
   wherein said prefetch predictor table further includes a second plurality of entries each corresponding to a respective one of said first plurality of entries, wherein each of said second plurality of entries includes a count value indicative of a number of times said stride between a respective pair of memory requests is equal to said value of said current stride; and
   a prefetch control coupled to said prefetch predictor table and configured to access a first location of said plurality of locations dependent upon a value of a current stride and to prefetch an address based upon a given one of said first plurality of entries stored within the first location in response to said count value stored within the first location being greater than a first predetermined threshold.

20. A computer system comprising:
a system memory configured to store instructions and data;
a processor coupled to execute said instructions; and
a system controller coupled between said processor and said system memory, wherein said system controller includes a memory controller configured to control accesses to said system memory, wherein said memory controller includes a prefetch mechanism comprising:
   a prefetch predictor table including a plurality of locations configured to store a first plurality of entries each indicative of a stride between a respective pair of memory requests, wherein each of said plurality of entries is stored in a respective location of said plurality of locations dependent upon a value of an earlier stride;
   wherein said prefetch predictor table further includes a second plurality of entries each corresponding to a respective one of said first plurality of entries wherein each of said second plurality of entries includes a count value indicative of a number of times said stride between a respective pair of memory requests is equal to said value of said current stride; and
   a prefetch control coupled to said prefetch predictor table and configured to access a first location of said plurality of locations dependent upon a value of a current stride and to prefetch an address based upon a given one of said first plurality of entries stored within the first location in response to said count value stored within the first location being greater than a first predetermined threshold.

* * * * *